United States Patent
Reichman et al.

(10) Patent No.: US 6,414,805 B1
(45) Date of Patent: Jul. 2, 2002

(54) REFLECTED-LIGHT TYPE FLUORESCENCE MICROSCOPE AND FILTER CASSETTE USED THEREFOR

(75) Inventors: Jay Arthur Reichman, Vermont, VT (US); Atsuhiro Tsuchiya, Hachioji (JP)

(73) Assignees: Chroma Technology Corp., Brattleboro, VT (US); Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/456,228

(22) Filed: Dec. 7, 1999

(51) Int. Cl.[7] .............. G02B 5/22; G02B 7/18; G02B 7/16; G02B 7/00
(52) U.S. Cl. ............ 359/889; 359/351; 359/361; 359/891
(58) Field of Search .............. 359/351, 361, 359/381, 821, 885, 889, 892

(56) References Cited

U.S. PATENT DOCUMENTS

| | | | | |
|---|---|---|---|---|
| 3,918,793 A | * | 11/1975 | Kraft | 359/389 |
| 5,371,624 A | * | 12/1994 | Nagano et al. | 359/389 |
| 5,633,752 A | | 5/1997 | Tsuchiya et al. | |

FOREIGN PATENT DOCUMENTS

| | | |
|---|---|---|
| JP | 56-19605 | 5/1981 |
| JP | 59-189613 | 12/1984 |

* cited by examiner

*Primary Examiner*—Jon Henry
(74) *Attorney, Agent, or Firm*—Frishauf, Holtz, Goodman, Langer & Chick, P.C.

(57) ABSTRACT

In a reflected-light type fluorescence microscope having a turret type filter cassette capable of switching a plurality of excitation filters, a plurality of barrier filters, and a plurality of dichromatic mirrors and selecting a desired set of excitation filter, barrier filter, and dichromatic mirror upon rotation of a turret to perform fluorescence observation of a specimen, the excitation filters, barrier filters, and dichromatic mirrors are directly mounted on the turret. The turret has a shape obtained by cutting the sharp portion of a polyhedral pyramid (for example, octahedral pyramid) having a rotation axis as its central axis along a plane perpendicular to the central axis. The eight equiangular conical surfaces make 45° with the illumination and observation optical axes. Through holes are formed in the 45° conical surfaces to assure an optical path. The dichromatic mirrors are mounted to close the through holes such that the surfaces opposite to the reflection surfaces of the dichromatic mirrors serve as mounting surfaces.

20 Claims, 5 Drawing Sheets

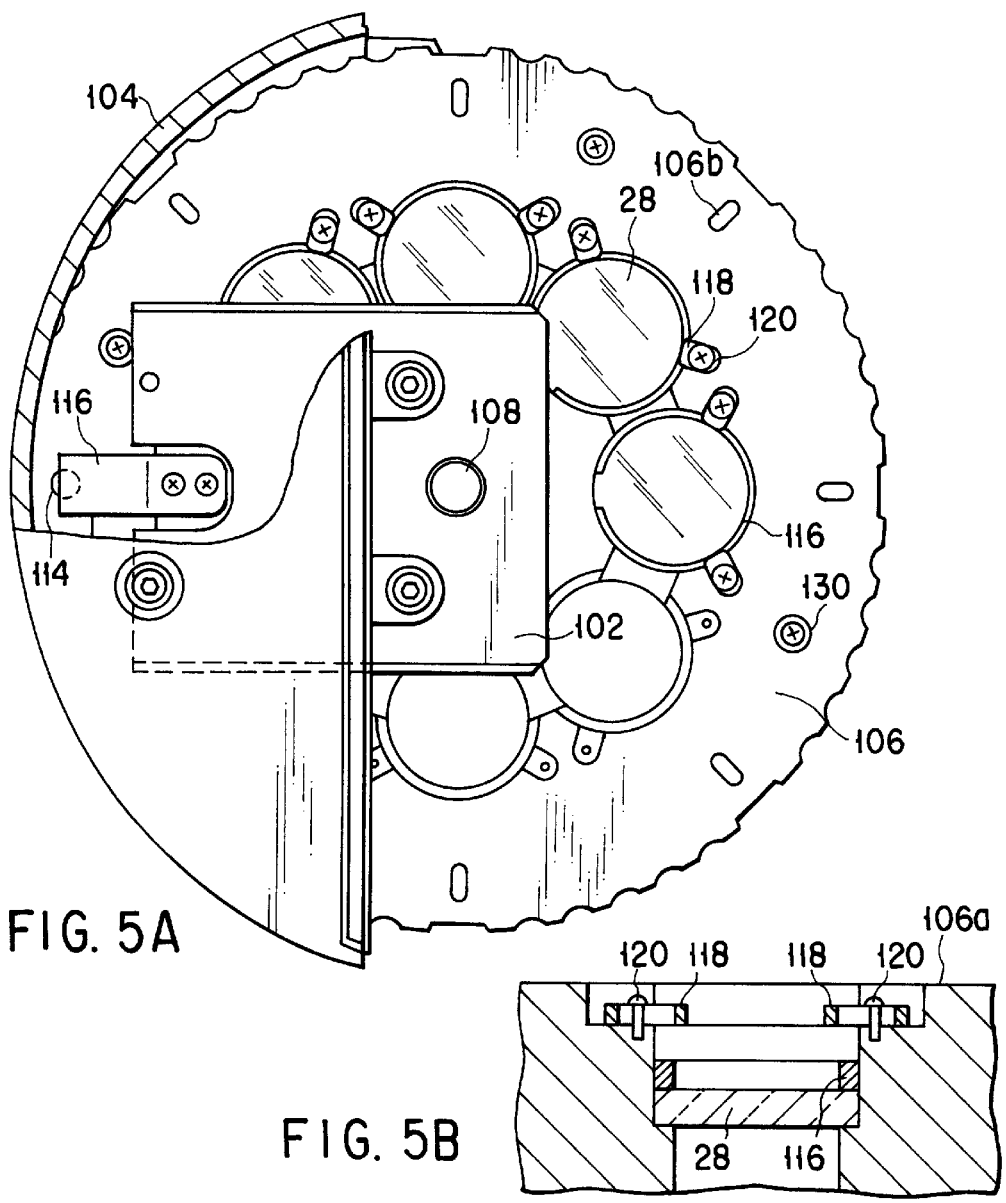
FIG. 5A
FIG. 5B
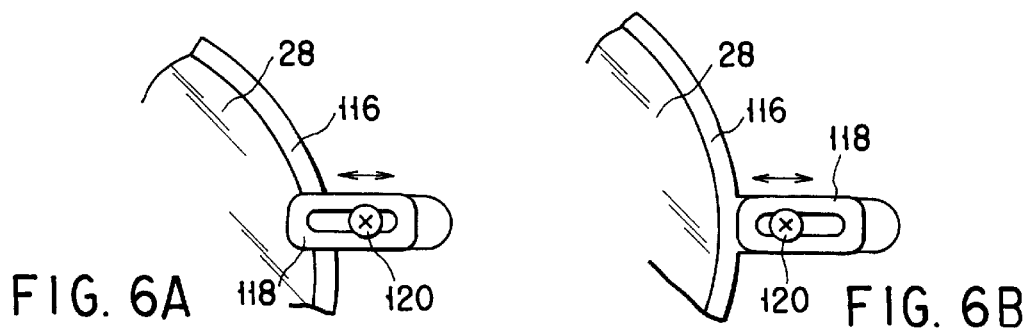
FIG. 6A
FIG. 6B

REFLECTED-LIGHT TYPE FLUORESCENCE MICROSCOPE AND FILTER CASSETTE USED THEREFOR

BACKGROUND OF THE INVENTION

The present invention relates to a reflected-light type fluorescence microscope and, more particularly, to a filter cassette used for it.

At present, reflected-light type fluorescence observation with a reflected-light type fluorescence microscope is generally popular as a means for observing the morphology of a specific substance in the cell in the field of biotechnology.

In a reflected-light type fluorescence microscope, a fluorochrome which reacts with the cells of a specimen to be observed is attached to the specimen, and excitation light having a specific wavelength corresponding to the fluorochrome is irradiated on the specimen. A specimen image formed by fluorescence generated by the excited fluorochrome is observed. In a reflected-light type fluorescence microscope, illumination light emitted from a light source along the horizontal optical axis is deflected 90° by a dichromatic mirror, and the deflected illumination light is irradiated on the specimen. The light reflected by the specimen is transmitted through the dichromatic mirror and observed. The dichromatic mirror has a function of selectively reflecting a specific wavelength of illumination light emitted from the light source and serving as excitation light, guiding the reflected light coaxially with an observation optical axis from the rear side (image side) of an objective lens to the specimen, allowing the objective lens to form an image, and selectively transmitting a specific wavelength of fluorescence from the specimen. Therefore, the optical axis for the illumination light is shifted 90° from the optical axis for the observation light. A dichromatic mirror inclined at 45° with respect to the illumination optical axis and the observation optical axis is placed at the intersection of these optical axes.

Different fluorochromes are used depending on the types of cells. The wavelength of excitation light changes depending on the types of fluorochromes. Fluorescence generated by a fluorochrome has a wavelength shifted toward the longer wavelength side with respect to the excitation light. Illumination light is irradiated on a specimen through an excitation filter that transmits only light having a specific wavelength, and fluorescence light is observed through a barrier filter that transmits only the light having the specific wavelength. The excitation and barrier filters and the dichromatic mirror must be replaced depending on the types of cells to be observed.

In a conventional incident-light fluorescence microscope using a turret type filter cassette described in Japanese Utility Model Disclosure (KOKAI) No. 59-189613, Japanese Patent Publication (KOKOKU) No. 56-19605, or the like, a plurality of cubes each integrally holding and fixing a total of three optical elements, i.e., one excitation filter, one barrier filter, and one dichromatic mirror together forming a set are prepared, and these cubes are detachable from a turret. A rectangular dovetail is employed as a mechanism for attaching/detaching each cube to/from the turret because this mechanism has excellent reproducibility and facilitates attaching/detaching operation. In a prior art, a plurality (four in this case) of cubes are attached to the turret. When a fluorochrome attached to cells to be observed next is different from that attached to cells currently observed, a cube having an appropriate filter must be selected by rotating the turret, or the cubes attached to the turret must be replaced with other cubes.

As described above, the dichromatic mirror must accurately make 45° with both the illumination optical axis and the observation optical axis; otherwise, the illumination optical axis is decentered relative to the observation optical axis to result in nonuniform illumination in the field of view. When cubes are attached to the turret or replaced, one must be careful not to disturb the above angular condition. Even if a cube attaching/detaching mechanism using a dovetail has excellent reproducibility, the absolute accuracy is determined by the machining precision of the dovetail mounting surface. To obtain a high accuracy, the dovetail must be made thick to assure rigidity. The resultant cubes become bulky, and the number of cubes that can be attached to the turret is undesirably reduced. In addition, the turret and hence the filter cassette become bulky.

BRIEF SUMMARY OF THE INVENTION

Accordingly, it is an object of the present invention to provide a compact, space-saving filter cassette for a reflected-light type fluorescence microscope to which a large number of filter sets can be attached.

It is another object of the present invention to provide a filter cassette for a reflected-light type fluorescence microscope free from decentering of the illumination optical axis relative to the observation optical axis, and nonuniform illumination in the field of view.

It is still another object of the present invention to provide a compact, space-saving optical system switching mechanism having a large number of optical elements.

According to the present invention, there is provided a filter cassette detachably mounted on a fluorescent microscope, holding excitation filters, dichromatic mirrors, and barrier filters, and selecting one of the excitation filters, a corresponding one of the dichromatic mirrors, and a corresponding one of the barrier filters, the filter cassette comprising a turret having a rotation axis parallel to an optical axis for observation light, a plurality of inclined surfaces inclined at 45° with respect to both of the rotation axis and an illumination optical axis, and through holes which extend from a top surface perpendicular to the rotation axis to the inclined surfaces and are parallel to the optical axis for the observation light, the dichromatic mirrors being mounted on the inclined surfaces, respectively, and the barrier filters being mounted on the top surfaces, respectively; and a cylindrical frame fixed around the turret to mount the excitation filters.

According to the present invention, there is provided an optical elements switching device comprising a turret having a shape obtained by cutting a sharp portion of a polyhedral pyramid having a rotation axis as a central axis along a plane perpendicular to the central axis; through holes formed to extend through a top surface of the turret and conical surfaces of the turret, a first optical path crossing the conical surfaces and a second optical path crossing the top surface; first optical elements mounted on the conical surfaces of the turret; and second optical elements mounted on the top surface. In the present specification, "a top surface of the turret" means a larger one of two surfaces perpendicular to the rotating axis of the turret having the above configuration.

According to the present invention, since the filters and the dichromatic mirror are directly attached to the turret, a large number of filters and dichromatic mirrors can be attached to the turret without increasing the size of the turret, thereby providing a compact, space-saving filter cassette for a reflected-light type fluorescence microscope.

According to the present invention, since the inclined surface is formed on the turret, and the dichromatic mirror is directly attached to this inclined surface, there is provided an optical elements switching device free from decentering of the illumination optical axis relative to the observation optical axis, and nonuniform illumination in the field of view.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 5A is a top view of the filter cassette;

FIG. 5B is a sectional view of a stepped portion of the turret to which a barrier filter is attached;

FIGS. 6A and 6B are views for explaining a method of attaching/detaching a barrier filter to/from the turret.

DETAILED DESCRIPTION OF THE INVENTION

A preferred embodiment of the present invention will now be described with reference to the accompanying drawings.

Figure 1:
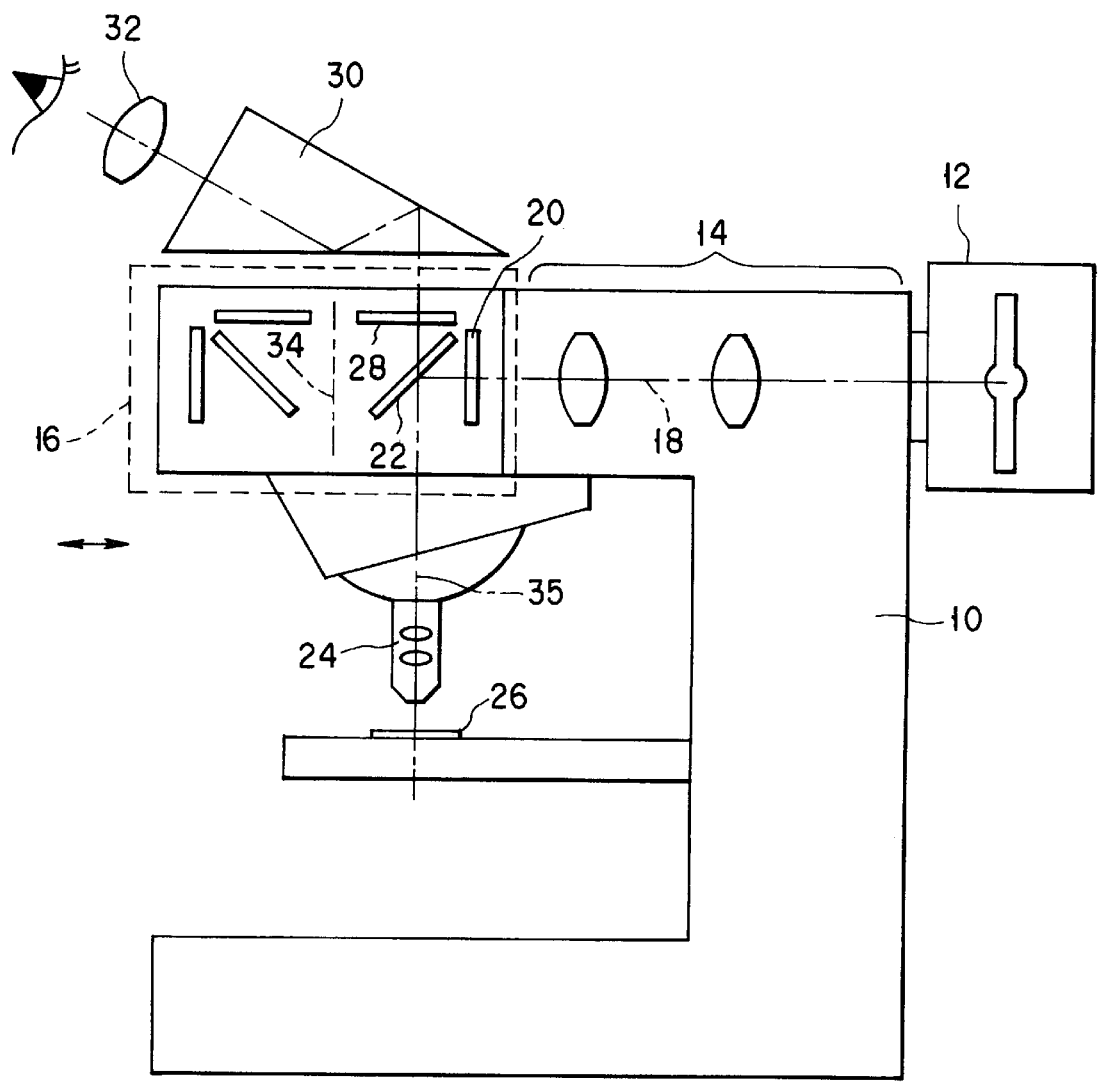
FIG. 1 is a schematic view showing the overall structure of a reflected-light type fluorescence microscope according to the first embodiment of the present invention.

FIG. 1 is a schematic view showing the overall structure of a reflected-light type fluorescence microscope according to the first embodiment. Illumination light from a light source 12 located on the rear surface of a microscope main body 10 is incident on a filter cassette 16 through an illumination optical system 14. Reference numeral 18 denotes an illumination optical axis which corresponds to the horizontal direction. The filter cassette 16 has a turret type switching mechanism and a plurality of filter sets. Illumination light is incident on only a desired filter set upon rotation of the turret about a rotation axis 34. Each filter set comprises an excitation filter 20 for receiving the illumination light and transmitting a specific wavelength component for exciting a specific fluorochrome, a dichromatic mirror 22 for selectively reflecting a specific wavelength of the excitation light from the excitation filter 20 to bend the optical path vertically downward by 90° and guide the deflected illumination light coaxially with the observation optical axis to a specimen 26 through an objective lens 24, and to selectively transmit a specific wavelength of fluorescence from the specimen 26, and a barrier filter 28 for receiving light passing through the dichromatic mirror 22 and transmitting only fluorescence generated by the specific fluorochrome. Although not shown, a plurality of objective lenses 24 may be used; a desired objective lens may be selected by a switching unit, and the selected objective lens may be inserted into the observation optical path.

Upon irradiation of the excitation light, the fluorescence generated by the fluorochrome attached to the specimen is focused by the objective lens 24 by moving up/down the sample by means of focusing mechanism. The focused image then passes through the dichromatic mirror 22 and the barrier filter 28 and enters a prism 30. The fluorescence image reflected in the prism 30 is observed by the naked eye at an eyepiece lens 32. Reference numeral 35 denotes an observation optical axis which corresponds to the vertical direction. As described above, since the illumination optical axis 18 is perpendicular to the observation optical axis 35, the dichromatic mirror 22 accurately makes 45° with both the illumination optical axis 18 and the observation optical axis 35. The rotation axis 34 of the filter cassette 16 is parallel to the observation optical axis 35 and corresponds to the vertical direction.

Figure 2:
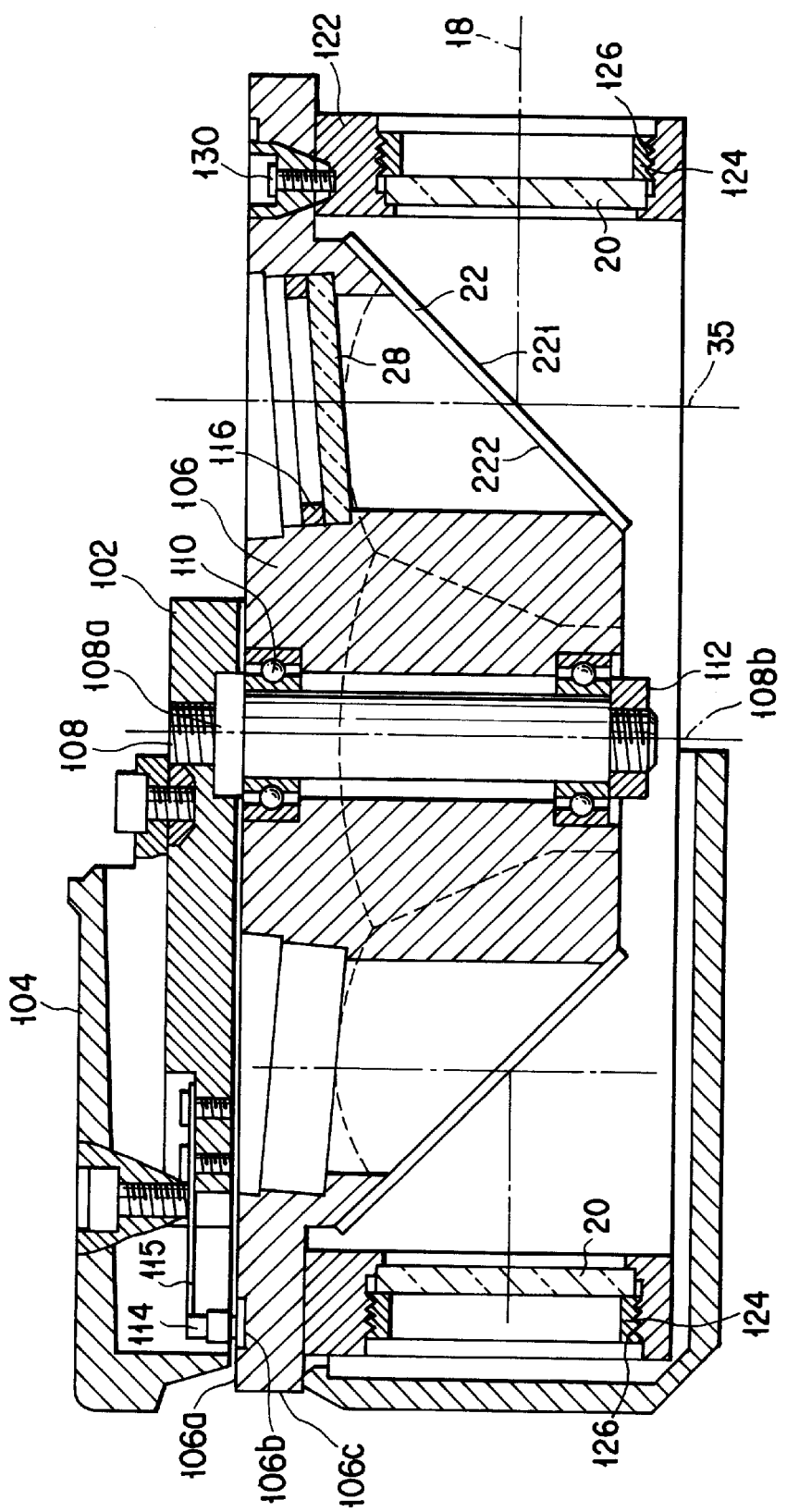
FIG. 2 is a side sectional view of a filter cassette used in the incident-light fluorescence microscope of the first embodiment.
Figure 3:
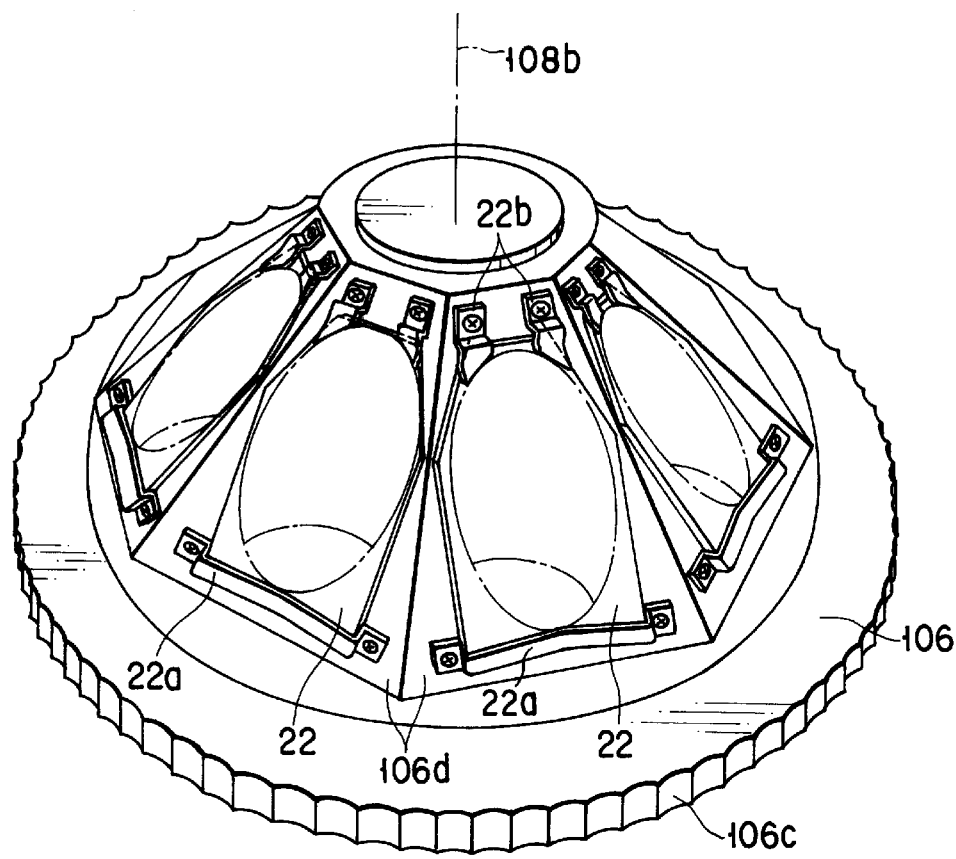
FIG. 3 is a perspective view showing only a turret.
Figure 7:
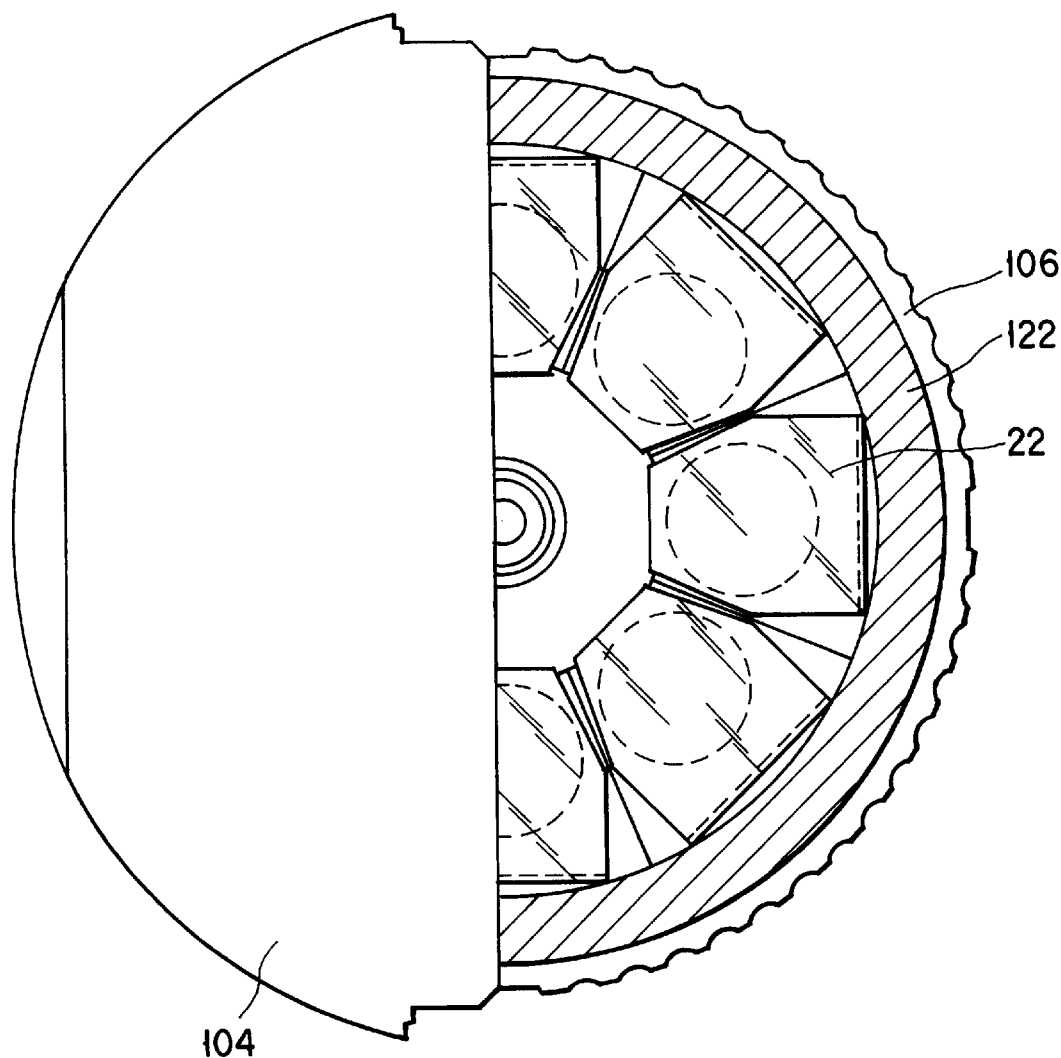
FIG. 7 is a bottom view of the filter cassette.

The structure of the filter cassette 16 will be described in detail below. FIG. 2 is a side sectional view of the filter cassette 16. FIG. 3 is a perspective view of a turret included in the filter cassette 16 (although the turret actually faces down and accommodated in the cassette, the turret is so illustrated as to face up for illustrative convenience). FIG. 5A is a top view of the filter cassette. FIG. 5B is a sectional view of a stepped portion of the turret to which a barrier filter is attached. FIGS. 6A and 6B are views for explaining operation for attaching/detaching the barrier filter to/from the turret. FIG. 7 is a bottom view of the filter cassette.

The filter cassette 16 is held on the microscope main body 10 to be detachable back and forth (along a direction of arrow in FIG. 1). A male dovetail 102 is formed in the upper surface of the filter cassette 16. Although not shown, a female dovetail is formed in the microscope main body 10. When the filter cassette 16 is mounted on the microscope main body 10, it partially projects from the microscope main body 10 and the projecting portion is covered with a cover 104. A notch is partially formed in the cover 104. A knurled portion 106c of a turret 106 projects from the notch. When the knurled portion 106c is rotated with a hand, the turret 106 rotates.

The filter cassette 16 has the turret 106 for mounting a plurality of filter sets. The male dovetail 102 serves as a stationary portion with respect to a movable member such as the turret 106. A shaft 108 is screwed and fixed in the male dovetail 102 serving as the stationary portion. As shown in FIG. 2, the inner rings of bearings 110 are fitted around the shaft 108, and the outer rings of the bearings 110 are fitted in the turret 106. The bearings 110 and the turret 106 are vertically clamped by a flange portion 108a of the shaft 108 and a nut 112. The turret 106 is held pivotally about a rotation axis 108b (the same as the rotation axis 34 in FIG. 1) of the shaft 108 through the bearings 110. Since the flange portion 108a of the shaft 108 and the nut 112 vertically clamp the inner rings of the bearings 110, any backlash of the inner and outer rings of the bearings 110 can be eliminated, and any angular error (the angle with respect to the illumination and observation optical axes shifts from 45°) of a dichromatic mirror 24 can be suppressed. In addition, decentering of the illumination optical axis relative to the observation optical axis, and nonuniform illumination in the field of view can be prevented.

A leaf spring 115, the distal end of which rotatably holds a roller 114, is fixed in the male dovetail 102. The roller 114 rotates in the circumferential direction of the turret 106 and is always pressed on a top surface 106a of the turret 106. When the turret 106 rotates, the roller 114 is fitted in a click groove 106b to determine the angular position of the turret 106. The click grooves 106b are formed in correspondence with the positions of the filter sets, respectively.

Figure 4A:
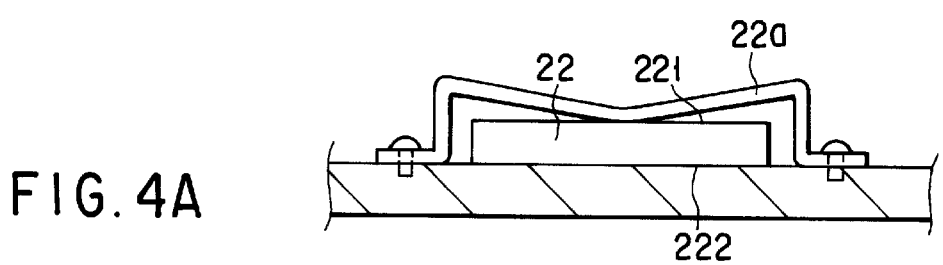
FIGS. 4A and 4E are views for explaining a method of attaching a dichromatic mirror to the turret.
Figure 4B:
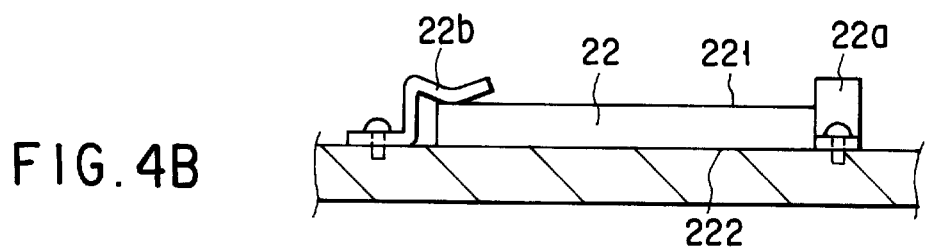

As shown in FIG. 3, the turret 106 has the shape of a truncated octahedral pyramid in which the sharp top of the pyramid is truncated along a plane perpendicular to the rotation axis 108b as the central axis. The eight conical surfaces 106d are formed such that each of which is inclined exactly at 45° with respect to the illumination optical axis 18 and the observation optical axis 35. Each dichromatic mirror 22 is mounted on a corresponding 45° conical surface 106d by a press member 22a and press members 22b. Each dichromatic mirror 22 is mounted on the turret 106 such that a surface opposite to the reflecting surface of the dichromatic mirror 22 serves as a mounting surface. The dichromatic mirror 22 is formed such that a reflecting surface 221 and another reflecting surface 222 are parallel to each other with a high accuracy in order to make the reflecting surface 221 incline exactly at 45° with respect to the illumination optical axis 18 and the observation optical axis 35. Since each 45° conical surface 106d has a trapezoidal shape, the corresponding dichromatic mirror 22 has a trapezoidal shape accordingly, or a hexagonal shape obtained by cutting the two bottom corners of a trapezoid, as shown in FIG. 3, i.e., a hexagonal shape obtained by cutting the two upper corners of a rectangle. The bottom side of each dichromatic mirror 22 is fixed to the turret 106 by one press member 22a, as shown in FIG. 4A, and the two, right and left vertices are fixed to the turret by two press member 22b, respectively, as shown in FIGS. 3 and 4B. Since the press members 22a and 22b are elastic members like a leaf spring, the dichromatic mirror 22 can be surely abutted to the conical surfaces 106d.

As shown in FIGS. 5A and 2, circular stepped holes extending through the 45° conical surfaces 106d are formed in the top of the turret 106 at eight equiangular positions having the rotation axis 108b as the center in order to assure an optical path for the observation light. One barrier filter 28 is fitted in a stepped portion of each through hole. As shown in FIG. 5B, a ring spring 116 is a leaf spring whose section perpendicular to the optical axis has an almost C shape. The ring spring 116 so presses as to adhere by friction to the inner surface of the corresponding stepped hole of the turret 106 in which the corresponding barrier filter 28 is fitted. When each barrier filter 28 is fitted in the stepped hole, and the corresponding ring spring 116 is mounted in the stepped hole, the barrier filter 28 is clamped and fixed between the ring spring 116 and the stepped portion.

A flat lid 118 which can slide along a corresponding one-step elongated hole is formed around the corresponding stepped hole of the top surface 106a of the turret 106, as shown in FIGS. 6A and 6B. When the lid 118 is slid, a stepped hole of the turret 106 which accommodates a given barrier filter 28 is partially closed (FIG. 6A) or opened (FIG. 6B) to allow replacement of the barrier filter 28. An elongated hole is formed in each lid 118 along the sliding direction. Each lid 118 is fixed by tightening a screw 120 in the elongated hole. Two lids 118 are used for each barrier filter 28, so a total of 16 lids 118 are formed.

A cylindrical excitation filter frame 122 for mounting the excitation filter 20 is fixed around the turret 106 with screws 130. Stepped through holes are formed in the excitation filter frame 122 at eight equiangular positions to assure an optical path for the illumination light. Each excitation filter 20 is fixed by a corresponding press ring 124 screwed into an internal thread 126 of the corresponding stepped hole.

The illumination light emitted from the light source 12 passes through the illumination optical system 14 and travels along the illumination optical axis 18. The excitation wavelength is selectively transmitted through the excitation filter 20, and the excitation light is reflected by the corresponding dichromatic mirror 22. The reflected light is vertically irradiated on the specimen 26 through the objective lens 24 on the observation optical axis 35. The fluorescence generated upon exciting the fluorochrome of the specimen forms an image through the objective lens. The wavelength of the image is selected by the corresponding dichromatic mirror 22 and the corresponding barrier filter 28. The selected image is observed through the eyepiece lens 32 as a fluorescence image representing the morphology of cells.

To observe other fluorochromes, the operator rotates with his hand the knurled portion 106c of the turret 106 which is partially exposed from the cover 104, thereby rotating the turret 106. An excitation filter 20, a dichromatic mirror 22, and a barrier filter 28, all of which correspond to a desired excitation wavelength, are inserted into the optical axis by a positioning mechanism constructed by the leaf spring 116, the roller 114, and the click groove 106b. In the conventional case, a cube having filters and a dichromatic mirror is mounted on the turret through an attaching/detaching mechanism such as a dovetail. According to the present invention, however, this structure is not provided. The filters 20 and 28 and the dichromatic mirror 22 are directly mounted on the turret 106. Therefore, eight filter sets can be mounted on the turret 106. The number of filter sets is twice that of the conventional case in which four filter sets are normally mounted using the cubes. Filters corresponding to the excitation wavelengths of almost all fluorochromes available can be selectively used by only rotating the turret 106. Since the dichromatic mirrors 22 are directly mounted on the 45° conical surfaces 106d of the turret 106, decentering of the illumination optical axis relative to the observation optical axis, and nonuniform illumination in the field of view can be prevented.

When a filter for a desired wavelength is not present in the eight filter sets, and the filter set (including two filters and the dichromatic mirror) must be replaced, the following operation is performed. Each excitation filter 20 can be easily replaced by loosening the corresponding press ring 124 and removing this press ring 124 from the corresponding internal thread 126 of the excitation filter frame 122. Each barrier filter 28 can also be easily replaced by loosening the corresponding screws 120, sliding and opening the corresponding lids 118, and compressing the ring springs 116 inward to remove the ring springs 116. Each dichromatic mirror 22 can be easily replaced by removing the corresponding press members 22a and 22b.

As described above, according to this embodiment, there is provided a reflected-light type fluorescence microscope comprising a light source for emitting illumination light; a plurality of excitation filters each for extracting a light component having a predetermined wavelength from the illumination light; an objective lens having an optical axis perpendicular to an optical axis for the illumination light; a plurality of dichromatic mirrors each for reflecting excitation light extracted by a corresponding one of the excitation filters, irradiating the reflected excitation light on a specimen, attached with a fluorochrome, through the objective lens, and transmitting a fluorescence image emitted from the fluorochrome of the specimen and obtained through the objective lens; a plurality of barrier filters each for extracting a light component having a wavelength, shifted by a predetermined amount from the predetermined wavelength, from the fluorescence image passing through a corresponding one of the dichromatic mirrors; and a turret for holding the plurality of excitation filters, the plurality of dichromatic mirrors, and the plurality of barrier filters, the turret having surfaces inclined at 45° with respect to the optical axis for the illumination light and the optical axis of the objective lens and mounted with the dichromatic mirrors, respectively, a set of one excitation filter, one dichromatic mirror, and one barrier filter being inserted in the optical axis for the illumination light and the optical axis of the objective lens upon rotation of the turret. Thus, neither the excitation and barrier filters and the dichromatic mirrors are fixed to the cube nor the cube is mounted on the turret through the dovetail. The barrier filters and the dichromatic mirrors are directly mounted on the turret. The excitation filters are mounted in the cylindrical mounting frame fixed to the turret. There can be provided a filter cassette for a reflected-light type fluorescence microscope which can have a large number of filter sets without increasing the size and is free from decentering of the illumination optical axis relative to the observation optical axis, and nonuniform illumination in the field of view. Since the filters and the dichromatic mirror are respectively mounted on the turret, there can be provided a filter cassette for a reflected-light type fluorescence microscope which can facilitate their replacement.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, in the above embodiment, the filters and the dichromatic mirror can be replaced. However, since a large number of filter sets are mounted, as compared with the conventional case, replacement may not be necessary in some case. In this case, the filters and the mirrors can be adhered or fixed. In the above description, the method by which the barrier filter is attached to the turret is different from the method by which the excitation filter is attached to the frame. However, the barrier filter and the excitation filter may be attached to the turret and the frame by the same method.

As has been described above, according to the present invention, since the filters and the dichromatic mirrors are directly mounted on the turret, a large number of filters and dichromatic mirrors can be mounted on the turret without increasing the turret size. Therefore, there is provided a compact, space-saving filter cassette for a reflected-light type fluorescence microscope.

The conical surfaces inclined at 45° with respect to the illumination and observation optical axes are formed on the turret, and the dichromatic mirrors are directly mounted on the conical surfaces, respectively. There is provided a filter cassette for a reflected-light type fluorescence microscope free from decentering of the illumination optical axis relative to the observation optical axis, and nonuniform illumination in the field of view.

What is claimed is:

1. An optical elements switching device comprising:
    a turret having a shape of a truncated polyhedral pyramid and including a base surface and a plurality of side surfaces;
    through holes formed to extend through said side surfaces of said turret and said base surface of said turret, with a first optical path crossing the side surfaces and a second optical path crossing the base surface;
    first optical elements arranged on the side surfaces of said turret; and
    second optical elements arranged on the base surface of said turret.

2. An optical element switching device according to claim 1, wherein a rotation axis of said turret is parallel to said second optical path and the side surfaces of said turret are inclined at 45° with respect to the rotation axis of said turret, said first optical path, and said second optical path.

3. An optical elements switching device according to claim 1, wherein said first optical elements are dichromatic mirrors and said second optical elements are barrier filters.

4. An optical elements switching device according to claim 1, wherein said first optical elements have a trapezoidal shape.

5. An optical elements switching device according to claim 1, wherein said first optical elements have a shape defined by truncated adjacent corners of a quadrilateral.

6. An optical elements switching device according to claim 1, wherein said first optical elements have a hexagonal shape.

7. An optical elements switching device according to claim 1, wherein said turret has a truncated octahedral pyramid shape with a sharp portion of the pyramid truncated along a plane perpendicular to a rotation axis of said turret.

8. An optical elements switching device according to claim 1, further comprising a cylindrical frame fixed around said turret to rotate with said turret, and wherein third optical elements are arranged on said cylindrical frame so as to be located in the first optical path.

9. An optical elements switching device according to claim 8, wherein said third optical elements are excitation filters.

10. An optical elements switching device according to claim 8, wherein said cylindrical frame is fixed to the base surface of said turret.

11. An optical elements switching device according to claim 1, wherein said first optical elements are wider in a portion oriented toward the base surface than in a portion spaced from the base surface.

12. An optical elements switching device comprising:
    a turret having a rotation axis;
    a base optical mounting surface generally perpendicular to the rotation axis; and
    a plurality of side optical mounting surfaces arranged at an acute angle with respect to said base surface such that a first optical path crosses the side surfaces and a second optical path crosses the base surface.

13. An optical elements switching device according to claim 1, wherein the side surfaces are inclined at 45° with respect to a rotation axis of the turret.

14. An optical elements switching device according to claim 4, wherein the side surfaces are inclined at 45° with respect to a rotation axis of the turret.

15. An optical elements switching device according to claim 5, wherein the side surfaces are inclined at 45° with respect to a rotation axis of the turret.

16. An optical elements switching device according to claim 6, wherein the side surfaces are inclined at 45° with respect to a rotation axis of the turret.

17. An optical elements switching device according to claim 7, wherein the side surfaces are inclined at 45° with respect to a rotation axis of the turret.

18. An optical elements switching device according to claim 8, wherein the side surfaces are inclined at 45° with respect to a rotation axis of the turret.

19. An optical elements switching device according to claim 11, wherein the side surfaces are inclined at 45° with respect to a rotation axis of the turret.

20. An optical elements switching device according to claim 12, wherein the side surfaces are inclined at 45° with respect to the rotation axis of the turret.

* * * * *